July 4, 1967  D. R. TANGUY  3,329,889
METHODS AND APPARATUS FOR INVESTIGATING EARTH FORMATIONS
FEATURING SIMULTANEOUS FOCUSSED COIL AND ELECTRODE
SYSTEM MEASUREMENTS
Filed Nov. 28, 1962  4 Sheets-Sheet 2

Denis R. Tanguy
INVENTOR.

BY Richard E. Bee

ATTORNEY

United States Patent Office 3,329,889
Patented July 4, 1967

3,329,889
METHODS AND APPARATUS FOR INVESTIGATING EARTH FORMATIONS FEATURING SIMULTANEOUS FOCUSSED COIL AND ELECTRODE SYSTEM MEASUREMENTS
Denis R. Tanguy, Houston, Tex., assignor to Schlumberger Technology Corporation, Houston, Tex., a corporation of Texas
Filed Nov. 28, 1962, Ser. No. 240,534
6 Claims. (Cl. 324—1)

This invention relates to methods and apparatus for investigating subsurface earth formations traversed by a borehole and, particularly, to such methods and apparatus which measure the electrical properties of the subsurface earth material adjacent the borehole.

In the quest for oil, gas and other forms of hydrocarbons located below the surface of the earth, it is known that the mere drilling of a borehole into the earth usually does not provide sufficient information concerning the existence, depth, quantity, producibility, etc. of such hydrocarbons. Consequently, various so-called electrical logging methods have been developed for providing this information. These methods make use of some form of electrical exploring device or sensing system which is moved through the borehole and which operates to measure an electrical characteristic of the adjacent formation material during the course of such movement. A typical characteristic which is frequently measured is the electrical resistance of the formation material. In theory, the electrical resistance should be relatively high when the formation pore spaces contain a high percentage of hydrocarbons because hydrocarbons are relatively poor conductors of electricity. When such hydrocarbons are not present, on the other hand, the pore spaces will be filled with connate formation water. In the majority of cases, such formation water is a relatively good conductor of electricity and, hence, a formation which is saturated with such formation water should have a relatively low value of electrical resistance.

In practice, both the making and the interpretation of the electrical measurements do not turn out to be such a simple matter. In the first place, the electrical resistance which is measured is dependent on the amount of the formation pore space, commonly referred to as the formation "porosity," as well as the nature of the fluid contained is this pore space. Consequently, two different formations containing the same kind of fluid but having different porosities will have different resistance values.

Another factor which renders the interpretation of the measurements more difficult is the common practice of filling the borehole with a drilling fluid or drilling mud during the drilling operation. As a result, some of this drilling mud will flow or penetrate laterally into any of the subsurface formations which are of a permeable nature. During the course of this lateral invasion, the larger solid particles contained in the drilling mud deposit themselves on the wall of the borehole in the form of a mudcake. At the same time, the residue or mud filtrate which actually invades the formation displaces a large portion, if not all, of the formation fluids which were originally present. The extent of this lateral invasion from formation to formation. Sometimes it is only a few inches, sometimes it is many tens of inches. These permeable formations, however, are of particular interest because the hydrocarbons which are readily capable of being brought up to the surface of the earth are found in such permeable formations.

The existence of mud filtrate invasion into the virgin formation material, the existence of a mudcake on the borehole wall, and the fact that the measurement is made by a device located in a borehole which is filled with a column of drilling mud which is frequently of a relatively conductive nature all affect the electrical measurement which is made. In general, any electrical measurement made in a borehole is dependent to a greater or lesser degree on the diameter of the borehole, the electrical resistance of the drilling mud, the thickness and electrical resistance of the mudcake, the extent of lateral mud filtrate invasion, the electrical resistance of the mud filtrate, the physical porosity of the formation, and the nature and electrical resistance of the fluid originally contained in the formation. Also, when relatively thin formations are encountered, more than one type of formation may enter into the measurement being made at any given moment. This same problem is also encountered at the boundary between two different formations.

Because of the foregoing consideraions, a relatively large number of different types of electrical exploring devices or measuring systems have been heretofore proposed for measuring the electrical resistance (either resistivity or conductivity) of subsurface earth formations. One type of such measuring or logging system uses metal electrodes for emitting electrical current directly into the earth formations and for detecting voltages resulting from such current flow. Another type of logging system employs induction coils for electromagnetically inducing current flow in the earth formations and for detecting the secondary electromagnetic fields produced by such current flow. Many different forms of construction have been proposed for both types of systems, the different forms having different investigation patterns which are affected in different ways by the various subsurface parameters. Some are so-called focussed systems, while others are unfocussed systems. Each has its own advantages and limitations.

It has been heretofore proposed to overcome the limitations of any one type of exploring device or system by making multiple measurements with two or more different types of devices or systems. This results in a record or log having recorded thereon two or more curves, depending on the number of measurements which are made. The multiple measurements which have been heretofore proposed, however, suffer from at least two drawbacks. One is that their interpretation is relatively tedious and difficult. This leads to mistakes and errors in interpretation. Another drawback is that the multiple measurements heretofore proposed have frequently fallen short of the desirable objective of providing accurate indications of the nature and relative amounts of the various fluids originally present in the subsurface formations.

Another problem, which is equally as difficult as the problem of interpretation, is the problem of constructing the apparatus for performing the multiple measurements. The economics of the situation indicate that the measurements should be made in as few trips through the borehole as is possible. Consequently, the different exploring systems should all be located on a single piece of borehole apparatus. This, however, is not very easy to accomplish. The narrow confines of the borehole considerably restrict the size of the apparatus. The possibility of undesired interaction between the different systems also imposes a severe limitation as to the number and types of systems which can be incorporated together or on a single piece of apparatus. This is particularly true of the so-called focussed systems because any individual focussed system is, in itself, a relatively complex structure.

It is an object of the invention, therefore, to provide new and improved methods of investigating subsurface earth formations traversed by a borehole.

It is another object of the invention, to provide new and improved borehole investigating methods which provide indications of the electrical characteristics of the subsurface formations which are easier and quicker to interpret.

It is a further object of the invention to provide new and improved borehole investigating methods which enable a more accurate determination of the nature and relative amounts of the various fluids originally contained in the subsurface earth formations.

It is an additional object of the invention to provide new and improved borehole investigating methods which provide a more accurate overall picture of the nature and conditions of the subsurface earth formations.

It is yet another object of the invention to provide new and improved borehole investigating methods which give a more accurate indication of the extent of any lateral invasion of drilling fluids into the subsurface formations.

It is a further object of the invention to provide new and improved borehole investigating apparatus which enables multiple measurements to be obtained on a single trip through the borehole with a minimum of adverse interaction between the measuring systems.

It is another object of the invention to provide new and improved borehole investigating apparatus for making multiple borehole measurements and for presenting the results of these measurements in a manner which is more readily and easily interpreted.

It is a further object of the invention to provide new and improved borehole investigating apparatus which combines a plurality of focussed-type exploring systems into a single piece of apparatus with a minimum of adverse interaction between the different systems.

It is an additional object of the invention to provide new and improved borehole investigating apparatus for enabling multiple induction type measurements to be made on a single trip through the borehole.

In accordance with one feature of the invention, a method of obtaining an improved indication of the nature of subsurface earth formations traversed by a borehole comprises the step of measuring the electrical resistance of the formation material at a first lateral distance from the borehole by means of a shallow-penetration electrode system. The method also comprises measuring the electrical resistance of the formation material at a second lateral distance from the borehole by means of a first focussed coil system which is predominantly responsive to formation material at this second lateral distance. The method further includes the step of measuring the electrical resistance of the formation material at a third lateral distance from the borehole by means of a second focussed coil system which is predominantly responsive to formation material at this third lateral distance. The method also comprises recording these measurements on a common recording medium as a function of borehole depth.

In accordance with another feature of the invention, apparatus is provided whereby these various electrode and coil systems are combined as a single piece of apparatus. Consequently, the various measurements may be made in a simultaneous manner as the single piece of apparatus is moved through the borehole.

For a better understanding of the present invention, together with other and further objects and features thereof, reference is had to the following description taken in connection with the accompanying drawings, the scope of the invention being pointed out in the appended claims.

Referring to the drawings.

Figures 1, 2A:
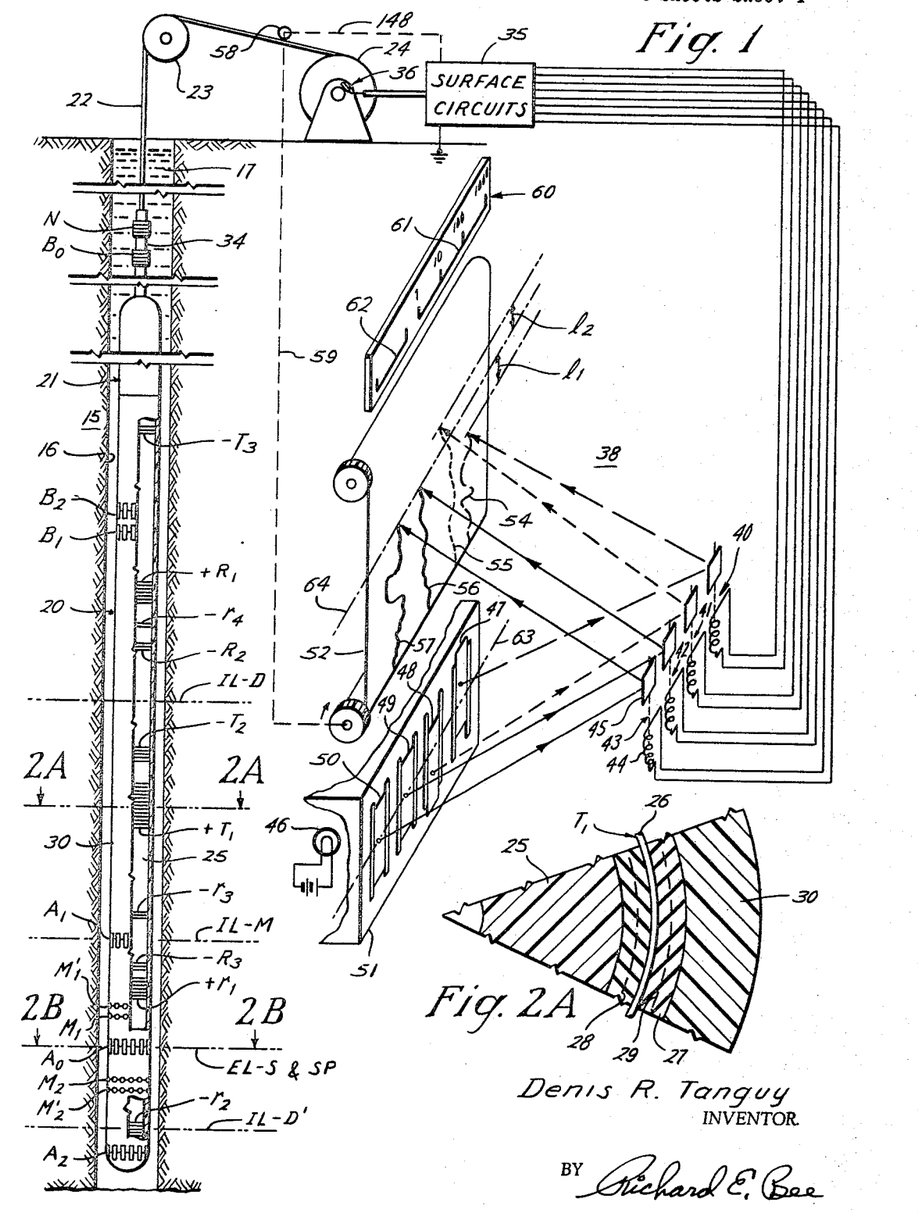
FIG. 1 illustrates in a schematic and partly cross-sectional manner, the general features of a representative embodiment of borehole investigating apparatus constructed in accordance with the present invention.
FIGS. 2A and 2B are cross-sectional views of portions of FIG. 1 apparatus taken along the section lines 2A—2A and 2B—2B thereof.

Referring to FIG. 1 of the drawings, there is shown a representative embodiment of apparatus constructed in accordance with the present invention for investigating sub-surface earth formations 15 traversed by a borehole 16. Borehole 16 is filled with a conductive drilling fluid or drilling mud 17. The borehole or downhole portion of the investigating apparatus includes an elongated cylindrical support member or housing member 20 to which are secured the sensing elements of the various exploring systems. Secured to the upper end of the support member 20 is an elongated cylindrical fluid-tight housing 21. Housing 21 contains various electrical circuits used in the operation of the sensing elements mounted on support member 20. The downhole apparatus, including the support member 20 and the fluid-tight housing 21, are suspended from the surface of the earth by means of an armored multiconductor cable 22. At the surface, this cable 22 passes over a pulley 23 and to a drum and winch mechanism 24. Operation of the drum and winch mechanism 24 serves to move the downhole portion of the apparatus through the borehole 16.

The various exploring devices or exploring systems which are secured to the support member 20 include a first focussed coil system for measuring the electrical resistance of the formation material at a medium lateral distance (horizontal distance in the case of a truly vertical borehole) from the center of the borehole 16. This coil system is referred to as the IL–M system (Induction Log–Medium). This IL–M coil system includes a plurality of transmitter coils $T_1$, $T_2$ and $T_3$ and a plurality of receiver coils $r_1$, $r_2$, $r_3$ and $r_4$. These coils are of the cylindrical solenoid type and are comprised of one or more turns of insulated conductor wire which is wound amound a cylindrical center mandrel 25 which forms the core of the support member 20.

The precise manner of construction of the coils is indicated in greater detail in the cross-sectional view of FIG. 2A, which is taken through the center of the transmitter coil $T_1$. As there indicated, the coil $T_1$, which is represented by a turn of conductor wire 26, is embedded in a layer of rubber material 27 which encircles the center mandrel 25. Also embedded in the rubber material 27 is an inner electrostatic shield 28 and an outer electrostatic shield 29. This entire assembly, including the center mandrel 25 and the rubber material 27, is enclosed by an outer sleeve member 30. As seen in FIG. 1, this outer sleeve member 30 is an elongated sleeve member of cylindrical shape which extends the entire length of the support member 20. (Part of the sleeve member 30 is broken away in the FIG. 1 view for purposes of showing the coils located therebelow.) Both the center mandrel 25 and the outer sleeve member 30 are constructed of a tough plastic material composed of a laminated fiberglass cloth material impregnated with epoxy resin.

The exploring systems mounted on the support member 20 also include a second focussed coil system for measuring the electrical resistance of the formation material at a deep lateral distance from the center of the borehole 16. This second coil system is designated as an IL–D system (Induction Log–Deep). It includes a plurality of transmitter coils $T_1$, $T_2$ and $T_3$ and a plurality of receiver coils $R_1$, $R_2$ and $R_3$. Each of these coils is of the solenoid type and comprises one or more turns of conductor wire which is wound around the center mandrel 25. The precise manner of construction is the same as that previously indicated for transmitter coil $T_1$.

It is noted that the transmitter coils $T_1$, $T_2$ and $T_3$ for the second coil system are the same transmitter coils which constituted part of the first coil system. Thus, a common set of transmitter coils is used for both the IL–M and the IL–D coil systems.

The various exploring systems included on the support member 20 further include a focussed shallow-penetration electrode system for measuring the electrical resistance of the formation material at a relatively shallow lateral distance from the center of the borehole 16. This electrode system is designated as an EL–S system (Electrode Log–Shallow). It is located toward the lower end of the support member 20 and includes a survey current electrode $A_0$ and upper and lower focussing current electrodes $A_1$ and $A_2$, respectively. It also includes a first pair of voltage monitoring electrodes $M_1$ and $M_1'$ located between the $A_0$ survey current electrode and the upper $A_1$ focussing current electrode. It further includes a second pair of voltage monitoring electrodes $M_2$ and $M_2'$ located intermediate the $A_0$ survey current electrode and the lower $A_2$ focussing current electrode. Each of these electrodes is secured to the exterior of the sleeve member 30. The $A_0$, $A_1$ and $A_2$ electrodes individually comprise a series of small rectangular metal plates which are positioned to encircle the circumference of the sleeve member 30. The rectangular plates of each electrode are connected together by means of a closed loop of conductor wire which encircles the sleeve member 30 immediately below the rectangular plates.

Figure 2B:
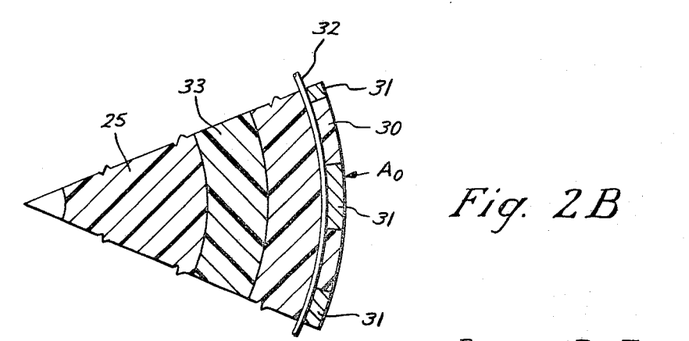

This manner of construction is indicated in greater detail for the case of the $A_0$ electrode in the cross-sectional view of FIG. 2B. In FIG. 2B, the small rectangular elements are represented by elements 31. The closed loop of conductor wire is represented by conductor wire 32. The plates 31 and conductor wire 32 are embedded in the outer surface of the sleeve member 30 with the outer faces of the plates 31 being exposed to the external environment. Since no induction coils are located beneath the $A_0$ electrode, the space between the center mandrel 25 and the outer sleeve member 30 is occupied by a plastic spacer member 33.

The voltage monitoring electrodes $M_1$, $M_1'$, $M_2$ and $M_2'$ are constructed in a similar manner except that small metal discs or buttons are used in place of the rectangular plates.

Additional information on the construction of the electrodes is given in co-pending application Serial No. 743,604, filed in the name of William P. Schneider on June 23, 1958, now Patent No. 3,124,742, granted March 10, 1964.

The electrode system also includes a pair of relatively close or electrically proximate current return electrodes $B_1$ and $B_2$ mounted toward the upper end of the support member 20. The $B_1$ electrode is the current return electrode for the $A_1$ focussing current electrode while the $B_2$ electrode is the current return electrode for the $A_2$ focussing current electrode. These $B_1$ and $B_2$ electrodes are constructed and secured to the exterior of the sleeve member 30 in the manner previously indicated for the other electrodes. The electrode system further includes a pair of relatively far removed or electrically remote electrodes $B_0$ and N. These remote electrodes are secured to the exterior of a layer of electrical insulation material 34 which surrounds the lower end of the armored cable 22. The $B_0$ electrode is a current return electrode for the $A_0$ survey current electrode while the N electrode is a remote voltage reference electrode which is used in connection with the voltage monitoring electrodes $M_1$, $M_1'$, $M_2$ and $M_2'$.

The various exploring systems mounted on the support member 20 also include means for measuring the naturally-occurring spontaneous earth potential existing in the fluid filled borehole 16. This spontaneous potential system is designated as an SP system. The means used to detect the spontaneous potential includes the $A_0$ survey current electrode of the EL–S electrode system.

The various electrical signals developed by the various downhole exploring systems are transmitted by way of the insulated conductors contained within the armored cable 22 to various surface circuits 35 located at the surface of the earth. Electrical connections between the cable conductors and the surface circuits 35 are made by way of an appropriate brush and slip ring assembly 36 associated with the drum and winch mechanism 24. These signals are processed by the surface circuits 35 in a manner to be considered hereinafter and then supplied to a photographic recorder 38 which is also located at the surface of the earth.

The photographic recorder 38 includes a plurality of mirror-type recording galvanometers 40, 41, 42 and 43 mounted in a side-by-side manner in a suitable galvanometer mounting block (not shown). The galvanometer 43, for example, includes a rotatable deflection coil 44 and a light reflecting mirror 45 mechanically secured thereto. The deflection coil 44 is located in a uniform magnetic flux field provided by a permanent magnet assembly included in the galvanometer mounting block (not shown). Consequently, any current flow through the coil 44 serves to cause angular rotation thereof and hence angular rotation of the mirror 45. The other galvanometers are of similar construction.

The recorder 38 also includes an individual adjustable light source for each of the galvanometers 40–43. These individual light sources are provided by an electric lamp 46 operating in conjunction with a plurality of adjustable aperture plates 47–50 which are slidably mounted on a suitable frame member 51. A small center aperture or passageway in each of the otherwise opaque aperture plates 47–50 constitutes a point source of light for one of the galvanometers 40–43. The resulting light beams provided by these point sources are reflected by the galvanometer mirrors onto a common photosensitive recording medium 52. Suitable optical lenses (not shown) are provided for providing the necessary focussing action. The recording medium 52 is an appropriate photographic film material coated with a suitable photosensitive emulsion.

The recording medium 52 is moved or advanced in synchronism with the movement of the downhole apparatus through the borehole 16 so that the various light beams are effective to produce continuous traces on the recording medium 52 as a function of borehole depth. Thus, the light beam of galvanometer 40 produces a trace 54, the light beam of galvanometer 41 a trace 55, the light beam of galvanometer 42 a trace 56 and the light beam of galvanometer 43 a trace 57. (These traces are, of course, not visible to the naked eye until the photographic film has been developed.) Movement of the recording medium 52 in synchronism with the downhole portion of the apparatus is provided by a mechanical measuring wheel 58 which engages the armored cable 22 and is rotated by the movement of such cable across the rim thereof. This measuring wheel 58 is coupled by a suitable linkage mechanism indicated schematically by dash line 59 to the roller mechanism associated with the recording medium 52.

The angular rotation of each of the galvanometers 40–43 is effective to deflect the corresponding light beam across the recording medium 52 in a direction at right angles to the direction of advancement of the recording medium 52. For the particular representation of FIG. 1, the recording medium advances in a vertical direction and the light beams are deflected in a horizontal direction. The recording medium 52 is provided with a scale calibration 60 which serves to calibrate the horizontal deflections of the galvanometer light beams. In this regard, the recording medium 52 is considered as being vertically divided into a pair of side-by-side portions as indicated by the two portions 61 and 62 of the scale calibration 60. Galvanometers 40, 41 and 42 are mechanically constructed so that their deflections can only produce traces on the first portion 61, while the galvanometer 43 is constructed to produce a trace only on the portion 62.

The adjustable nature of the aperture plates 47–50 enables adjustment of the vertical positions of the light beams on the recording medium 52. This feature is used to take into account the different vertical locations of the measuring points for the different exploring systems mounted on the downhole apparatus. Reference lines 63 and 64 represent corresponding horizontal reference lines for the aperture plates 47–50 and the recorder traces 54–57, respectively. Thus, if the center aperture in each of the aperture plates 47–50 is located on the reference line 63, then each of the light beams will strike the recording medium 52 on the reference line 64. Appropriate adjustment of the vertical positions of the center apertures in the aperture plates 47–50 will cause corresponding displacements of the light beams above or below the reference line 64 on the recording medium 52.

Figure 3:
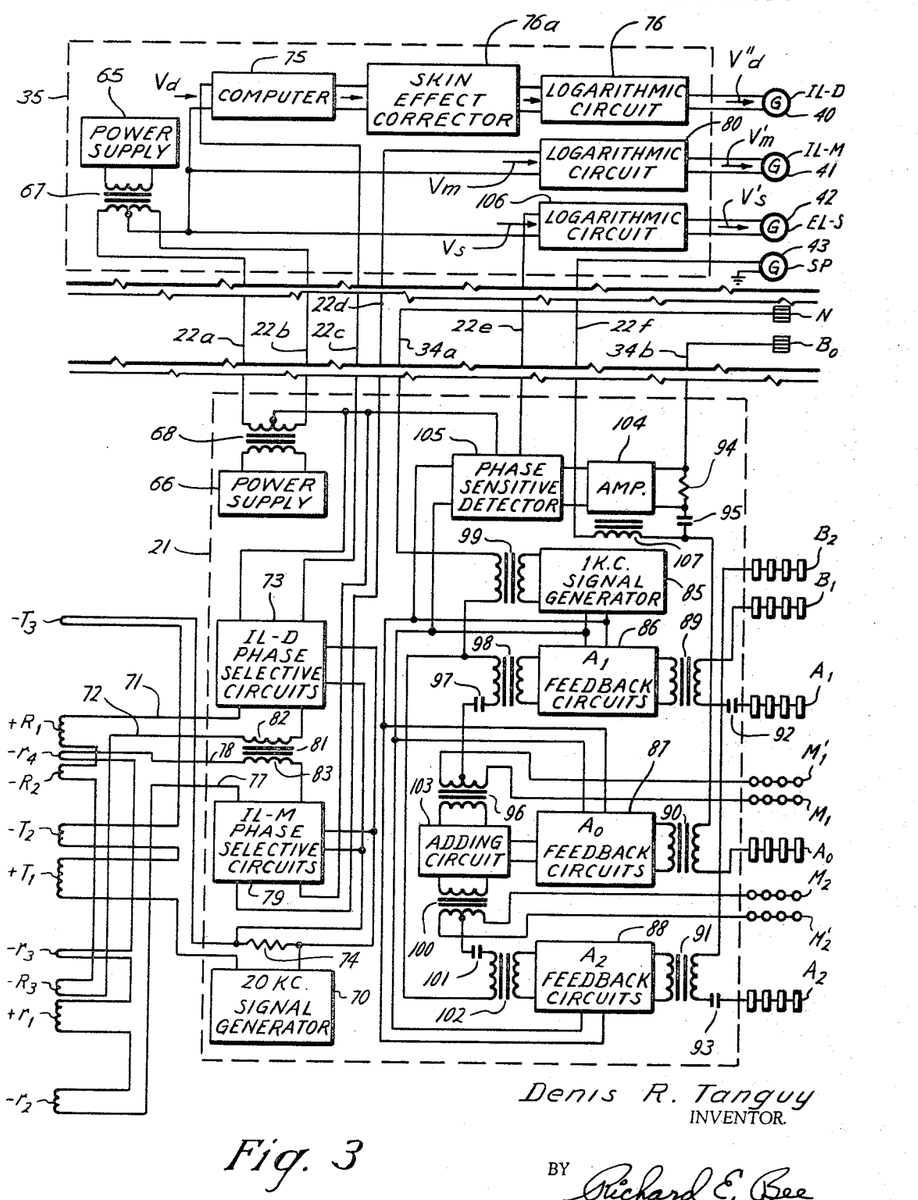
FIG. 3 is a schematic circuit diagram showing a representative embodiment of electrical circuits for use with the apparatus of FIG. 1.

Referring now to FIG. 3 of the drawings, there is shown in a schematic manner the various electrical circuits which are used in the investigating apparatus of FIG. 1. The circuits contained within the dash-line box 21 of FIG. 3 are the circuits which are contained in the fluid-tight housing 21 of the downhole apparatus of FIG. 1. The circuits contained within the dash-line box 35 of FIG. 3 are the circuits which are located at the surface of the earth. In FIG. 3, the galvanometers 40–43 are represented in a schematic manner, it being understood that their actual construction and cooperation with the remainder of the photographic recorder 38 is as indicated in FIG. 1.

Electrical power for operating the downhole circuits is provided by a power supply unit 65 located at the surface of the earth. This surface power supply 65 is connected to a downhole power supply 66 by way of a transformer 67, a pair of conductors 22 and 22b contained within the armored cable 22 and a downhole transformer 68. The power supply connections between the downhole power supply 66 and the other downhole circuits is omitted for sake of simplicity.

The downhole circuits of FIG. 3 include a first signal generator 70 for supplying energizing current to the transmitter coils $T_1$, $T_2$ and $T_3$. This energizing current is an alternating current of a constant predetermined frequency, such as 20 kilocycles per second, and is of constant peak amplitude. The connections between the signal generator 70 and the transmitter coils is such that these transmitter coils are connected in series with one another with the transmitter coils $T_2$ and $T_3$ being connected in a series-opposing manner with respect to the transmitter coil $T_1$. Transmitter coil $T_1$ is provided with a greater number of turns than any other of the transmitter coils and, hence, is considered as the main or primary transmitter coil. The polarity of $T_1$ is arbitrarily defined as being positive, in which case the polarities of $T_2$ and $T_3$ are negative.

The receiver coils $R_1$, $R_2$ and $R_3$ of the IL–D coil system are interconnected in a series manner with the coils $R_2$ and $R_3$ being connected in a series-opposing manner with respect to the coil $R_1$. Receiver coil $R_1$ has a greater number of turns than the other receiver coils and, hence, is considered as the main or primary receiver coil. Its polarity is assumed to be positive, in which case the other coils $R_2$ and $R_3$ are of negative polarity.

The interconnected receiver coils $R_1$, $R_2$ and $R_3$ are connected by way of a pair of conductors 71 and 72 to a first pair of input terminals of phase selective circuits 73. An alternating current phase reference signal having the same phase as the transmitter coil energizing current is developed across a resistor 74 of small resistance value connected in series with the supply circuit leads to the transmitter coils. This phase reference signal is supplied to a second pair of input terminals of the phase selective circuits 73. Under the control of this phase reference signal, the phase selective circuits 73 operate to develop a unidirectional or direct-current output signal which is proportional in magnitude to the magnitude of the component of the net receiver coil signal which is "in phase" with this phase reference signal. An "in phase" relationship is considered as including both a zero degree and a 180° phase relationship since both lie along the same phase axis.

The unidirectional signal appearing at the output terminals of phase selective circuits 73 is transmitted by way of a cable conductor 22c to a computer 75 located at the surface of the earth. A phantom signal return path is provided by power supply transformers 67 and 68 and cable conductors 22a and 22b. The computed signal appearing at the output of computer 75 is supplied in succession to a skin effect corrector 76a and a logarithmic circuit 76. A suitable form of circuit for the skin effect corrector 76a is described in copending application Ser. No. 34,825, filed on June 8, 1960 in the name of William P. Schneider, now Patent No. 3,226,633, granted Dec. 28, 1965. The resulting skin effect corrected logarithmic signal appearing at the output of logarithmic circuit 76 is then supplied to the galvanometer 40 to provide the recorder trace for the IL–D coil system.

The receiver coils $r_1$, $r_2$, $r_3$ and $r_4$ for the IL–M coil system are connected in series with one another with the $r_2$, $r_3$ and $r_4$ coils being connected in a series-opposing manner with respect to the $r_1$ coil. The $r_1$ coil has a greater number of turns than any other of these IL–M receiver coils and, hence, is designated as the main or primary IL–M receiver coil. Its polarity is assumed to be positive, in which case the polarities of the $r_2$, $r_3$ and $r_4$ coils are negative. The interconnected $r_1$–$r_4$ receiver coils are connected by a pair of conductors 77 and 78 to a first pair of input terminals of a second set of phase selective circuits 79. The phase reference signal developed across resistor 74 is also supplied to a second pair of input terminals of these phase selective circuits 79. The resulting unidirectional or direct-current signal at the output terminals of phase selective circuit 79 is proportional in magnitude to the magnitude of the component of the net signal provided by receiver coils $r_1$–$r_4$ which is in phase with this phase reference signal.

This unidirectional output signal is then transmitted by way of a cable conductor 22d to a logarithmic circuit 80 located at the surface of the earth. The resulting logarithmic signal at the output of logarithmic circuit 80 is then supplied to the galvanometer 41 to produce the recorder trace for the IL–M coil system on the recording medium 52.

In order to compensate for mutual coupling between the two sets of receiver coils, mutual impedance means in the form of a coupling transformer 81 is coupled between the output circuits for the two sets of receiver coils. More particularly, a first winding 82 of the coupling transformer 81 is connected in series with the conductor 72 for the IL–D receiver coils, while a second winding 83 is connected in series with the conductor 78 associated with the IL–M set of receiver coils. The coupling transformer 81 is constructed so that the mutual coupling between the two windings 82 and 83 thereof is equal in magnitude to the mutual coupling between the two sets of receiver coils. The windings 82 and 83 are, however, connected with the appropriate polarity so that in each circuit this mutual coupling is of opposite polarity to the mutual coupling between the two sets of receiver coils. In this manner, any voltage induced in one set of receiver coils as a result of current flow in the windings of the other set of receiver coils is effectively canceled out by an opposite polarity voltage provided by the coupling transformer 81.

Considering now the electrode system circuits, such circuits include a signal generator 85 for supplying an alternating current signal having a frequency different from the predetermined frequency of the transmitter coil energizing current. The frequency of the current supplied by signal generator 85 is, for example, one kilocycle per second. This alternating current signal is supplied to $A_1$ feedback circuits 86, $A_0$ feedback circuits 87 and $A_2$ feedback circuits 88. Each of these feedback circuits 86, 87 and 88 includes a variable gain amplifier which is constructed to amplify this alternating current signal and then supply it by way of respective output transformers 89, 90 and 91 to the respective ones of the $A_1$, $A_0$ and $A_2$ electrodes. These individual amplified signals thus serve to energize the $A_1$, $A_0$ and $A_2$ electrodes for causing these electrodes to emit currents into the adjacent earth formations.

A current return path for the $A_1$ focussing current is provided by the $B_1$ return electrode which is connected to the other end of the secondary winding of the $A_1$ output transformer 89. A direct-current blocking condenser 92 is connected in series between the $A_1$ electrode and the output transformer 89. A current return path for the $A_2$ focussing current is provided by the $B_2$ return electrode which is connected to the $A_2$ output transformer 91. A direct-current blocking condenser 93 is connected in series between the output transformer 91 and the $A_2$ electrode. A current return path for the $A_0$ survey current is provided by the remote $B_0$ electrode which is coupled back to the $A_0$ output transformer 90 by way of a measure resistor 94 and a direct-current blocking condenser 95. Measure resistor 94 is of small resistance value.

In the operation of the electrode system, it is desired to hold the voltage level at a prescribed point intermediate the focussing and survey current electrodes at a predetermined fixed value with respect to a remote reference point represented in the present embodiment by the reference electrode N. To this end, the $M_1$ and $M_1'$ voltage monitoring electrodes are connected by way of a center tap on the primary winding of a transformer 96 and a direct-current blocking condenser 97 to one end of the primary winding of an input transformer 98 for the the $A_1$ feedback circuits 86. The other or upper end of the primary winding of input transformer 98 is connected to a constant reference voltage source represented by a transformer 99. The primary winding of transformer 99 is connected to the signal generator 85 and this signal generator 85 serves to produce across the secondary winding of transformer 99 a one kilocycle reference voltage of fixed peak amplitude. The r.m.s. value of this reference voltage may be, for example, ten millivolts. Its phase angle is the same as the phase angle of the currents emitted by the $A_0$, $A_1$ and $A_2$ electrodes. The upper end of the secondary winding of reference voltage transformer 99 is connected to the remote reference electrode N.

Looking at the input transformer 98 for the $A_1$ feedback circuits, the upper end of the primary winding of this transformer is maintained at a fixed reference voltage level with respect to the N electrode by the reference voltage provided by reference voltage transformer 99. The lower end of the primary winding of input transformer 98, on the other hand, is at a voltage level corresponding to the voltage level midway between the $M_1$ and $M_1'$ voltage monitoring electrodes. If, as is desired, this voltage level midway between the voltage monitoring electrodes is equal to the fixed reference voltage, then no signal appears across the secondary winding of $A_1$ input transformer 98. If this voltage level is not equal to the reference voltage value, then an error signal proportional to the voltage difference appears across the secondary winding of $A_1$ input transformer 98. This error signal is supplied to the error signal input terminals of the $A_1$ feedback circuits. This error signal is rectified by a phase sensitive detector circuit included within the feedback circuits 86 and the rectified signal is applied to the variable gain amplifier to adjust the gain of the variable gain amplifier so that the amplitude of the alternating-current signal passing from signal generator 85 to the $A_1$ output transformer 89 is adjusted so as to minimize the undesired voltage difference. In this manner, the $A_1$ feedback circuits automatically operate to maintain the voltage level midway between the $M_1$ and $M_1'$ voltage monitoring electrodes at the desired fixed value corresponding to the value of the reference voltage provided by the reference voltage transformer 99.

The $A_2$ feedback circuits operate in a similar manner to automatically maintain the voltage level midway between the $M_2$ and $M_2'$ voltage monitoring electrodes at this same predetermined reference voltage level with respect to the remote electrode N. In particular, the $M_2$ and $M_2'$ voltage monitoring electrodes are connected by way of a center tap on the primary winding of a transformer 100 and a direct-current blocking condenser 101 to one end of the primary winding of an input transformer 102 for the $A_2$ feedback circuits 88. The lower end of the primary winding of input transformer 102 is connected to the source of fixed reference voltage represented by the reference voltage transformer 99.

In the operation of the electrode system, it is also desired to maintain both the voltage difference between the $M_1$ and $M_1'$ voltage monitoring electrodes and the voltage difference between the $M_2$ and $M_2'$ voltage monitoring electrodes at a value of substantially zero. This is done by connecting the voltage monitoring electrodes $M_1$ and $M_1'$ to a first pair of input terminals of a signal adding circuit 103 by way of the transformer 96. At this same time, the lower $M_2$ and $M_2'$ voltage monitoring electrodes are connected to a second pair of input terminals of this adding circuit 103 by way of the transformer 100. Adding circuit 103 serves to combine the two voltage signals corresponding to the voltage differences between the two pairs of monitoring electrodes. As a consequence, the signal appearing at the output terminals of the adding circuit 103 represents the average of these two voltage differences. This average signal is supplied to the error signal input terminals of the $A_0$ feedback circuits 87. This average signal or error signal is rectified and supplied to the variable gain amplifier to automatically adjust the gain applied to the alternating-current signal passing from the signal generator 85 to the $A_0$ output transformer 90 so as to reduce the average voltage difference between the two pairs of voltage monitoring electrodes to a very small value which, for all practical purposes, is equal to zero.

The electrode system also includes output circuit means for providing an electrical signal representative of the magnitude of the current emitted by the survey current electrode $A_0$. This output circuit means includes the measuring resistor 94, an amplifier 104 and a phase sensitive detector 105. A one kilocycle phase reference signal is supplied to a second pair of input terminals of the phase sensitive detector 105. Amplifier 104 serves to amplify the small voltage signal developed by the survey current as it flows through the resistor 94 during its passage back from the $B_0$ return electrode to the $A_0$ emitting electrode. This voltage signal, which is proportional in magnitude to the magnitude of the survey current, is then detected by the phase sensitive detector 105 to produce at the output terminals of the detector 105 a unidirectional or direct-current signal having a magnitude which is proportional thereto. The unidirectional signal at the output of phase sensitive detector 105 is transmitted by way of cable conductor 22e to a logarithmic circuit 106 located at the surface of the earth. The resulting logarithmic signal at the output of logarithmic circuit 106 is supplied to the galvanometer 42 to produce the recorder trace for the EL-S electrode system.

The present investigating apparatus also includes means for recording the spontaneous earth potential existing in the borehole 16. As indicated in FIG. 3, this means includes the $A_0$ survey current electrode, which electrode is also used to detect the spontaneous earth potential. This spontaneous earth potential is of a direct-current nature. In order to record this direct-current potential, the $A_0$ electrode is connected in a direct-current manner by way of the secondary winding of output transformer 90, an alternating-current blocking inductor 107 and a cable conductor 22f to the galvanometer 43 located at the surface of the earth. Galvanometer 43 serves to record the magnitude of this spontaneous earth potential as an additional trace on the recording medium 52. The alternating-current blocking inductor 107 serves to prevent any one kilocycle current from being supplied to the spontaneous potential galvanometer 43. Also, the various direct-current blocking condensers 92, 93, 95, 97 and 101 are used to prevent undesired direct-current current flow paths for the spontaneous earth potential between different ones of the electrodes of the electrode system.

Considering now the operation of the apparatus thus far described, as the downhole portion of the apparatus comprising the support member 20 and the fluid-tight housing 21 is moved through the borehole, the two signal generators 70 and 85 are continuously operative to supply energizing currents to the transmitter coils $T_1$, $T_2$ and $T_3$ and to the current-emitting electrodes $A_0$, $A_1$ and $A_2$, respectively. As a consequence, the transmitter coils $T_1$, $T_2$ and $T_3$ produce alternating magnetic flux fields which extend outwardly into the adjacent earth formations. These alternating flux fields induce alternating current flow in the adjacent formation material. These currents induced in the formation material flow in generally circular loops which are concentric with the borehole 16. These induced currents create secondary electromagnetic flux fields which couple with the various receiver coils and, hence, induce voltage components therein. The magnitude of these voltage components is proportional to the magnitude of the current flow in the earth material and, hence, proportional to the conductivity of such earth material.

Considering first the IL–D receiver coils $R_1$, $R_2$ and $R_3$, these receiver coils are constructed to cooperate with the transmitter coils $T_1$, $T_2$ and $T_3$ so that these receiver coils respond primarily only to the formation current which is flowing at a relatively large lateral distance from the borehole 16. This selective response is obtained by the proper selection of the spacings, polarities and relative numbers of turns for the coils $T_1$, $T_2$, $T_3$, $R_1$, $R_2$, and $R_3$. Consequently, the net voltage component developed across the series-connected receiver coils $R_1$, $R_2$ and $R_3$ which is in phase with the transmitter coil energizing current is directly proportional to the conductivity of the formation material in a lateral zone which is relatively far removed from the borehole 16. This net in-phase component is detected by the phase selective circuits 73 to provide the desired conductivity signal.

Quadrature-phase (either 90° or 270°) voltage components may also appear across the output terminals of the series-connected receiver coils $R_1$, $R_2$ and $R_3$, primarily because of direct mutual coupling between the transmitter and receiver coils. The coil system is, however, constructed to provide a minimum of such direct mutual coupling. In any event, the phase selective circuit 73 operates to reject any such quadrature-phase voltage components.

The resulting IL–D conductivity signal appearing at the output of the phase selective circuit 73 is supplied to the computer 75 which is located at the surface of the earth. The computer 75 operates to improve the vertical focussing characteristics of this conductivity signal, which is designated as $V_d$. More particularly, the computer 75 operates to compute the corresponding conductivity signal that would have been provided by a coil system having a sharper or narrower vertical response than the IL–D coil system which is actually used. What is done, in effect, is to remove from the actual conductivity signal $V_d$, the signal components contributed by formation regions lying more than a prescribed distance above or below the horizontal center line of the IL–D coil system. Consequently, the computed signal $V_d'$ appearing at the output of computer 75 is still proportional to the conductivity of the formation material in a zone at a large lateral distance from the borehole 16, the difference being that the vertical thickness of this zone has been reduced.

The computed conductivity $V_d'$ is supplied to a skin effect corrector 76a and a logarithmic circuit 76. Skin effect corrector 76a corrects the computed conductivity signal so as to compensate for any signal loss caused by the occurrence of electrical skin effect phenomena in the formation material. Logarithmic circuit 76 serves to convert the conductivity signal to a signal which is proportional to the logarithm thereof. Consequently, the signal $V_d''$ appearing at the output of circuit 76 is a signal which is proportional to the logarithm of the formation conductivity in the selected zone and which contains very little, if any, error due to the occurrence of electrical skin effect. This logarithmic signal $V_d''$ is then supplied to the galvanometer 40 to produce the appropriate trace on the recording medium 52.

At the same time that the IL–D receiver coils are operating to provide the deep zone conductivity signal, the IL–M receiver coils $r_1$, $r_2$, $r_3$ and $r_4$ are operating to provide a medium zone conductivity signal. In particular, the IL–M receiver coils $r_1$, $r_2$, $r_3$ and $r_4$ are constructed to cooperate with the transmitter coils $T_1$, $T_2$ and $T_3$ so as to respond primarily only to the earth currents which are flowing in a zone which is at a medium distance from the borehole 16. This selective response is obtained by proper selection of the spacings, number of turns and relative polarities of the coils $T_1$, $T_2$, $T_3$, $r_1$, $r_2$, $r_3$ and $r_4$. Consequently, the net voltage component induced across the series-connected receiver coils $r_1$, $r_2$, $r_3$ and $r_4$ which is in phase with the transmitter coil energizing current is proportional to the conductivity of the formation material in this medium zone. This voltage component is detected by the phase selective circuits 79, any residual quadrature-phase component being rejected by these circuits 79.

The medium zone conductivity signal appearing at the output of phase selective circuits 79 is supplied to a logarithmic circuit 80 located at the surface of the earth, this medium zone conductivity signal being designated as $V_m$. Logarithmic circuit 80 operates to produce an output signal $V_m'$ which is directly proportional to the logarithm of the incoming conductivity signal $V_m$. This logarithmic signal is then supplied to the galvanometer 41 to produce the appropriate trace on the recording medium 52.

It is noted that no vertical focussing computer or skin effect correction is provided for the case of the medium zone conductivity signal. No vertical focussing computer is necessary in this case because, since less lateral depth of penetration is required of the coil system, it can be constructed to provide a greater degree of vertical focussing. No skin effect correction is required for this medium zone signal because very little skin effect error is usually encountered where the net response of the coil system is limited to regions which are closer in to the coil system. If desired, however, skin effect correction can be provided for the medium zone signal in the same manner as for the deep zone signal.

Considering now the electrode system, the signal generator 85 is continuously operative to supply energizing voltages to the current-emitting electrodes $A_1$, $A_0$ and $A_2$, these voltages being supplied by way of the feedback circuits 86, 87 and 88, respectively. Consequently, each of the electrodes $A_1$, $A_0$ and $A_2$ operates to emit alternating current which flows outwardly from each of these electrodes and into the adjacent earth formation in all radial directions. The focussing current emitted from the upper and lower $A_1$ and $A_2$ electrodes serves to force the survey current flowing from the $A_0$ electrode into a beam of relatively narrow vertical thickness. This survey current beam is being emitted all around the circumference of the support member 20 so that the volume of formation material being traversed by this survey current is in the form of a circular disc surrounding the $A_0$ electrode.

The survey current is maintained in a focussed beam, even though the formation and borehole resistivities vary, because of the automatic feedback control action provided by the voltage monitoring electrodes $M_1$, $M_1'$ and $M_2$ and $M_2'$ and the $A_0$ feedback circuits 87. In particular, proper focussing of the survey current beam is indicated by the occurrence of a zero voltage difference between each pair of the voltage monitoring electrodes. Such a zero potential difference indicates that no current is flowing in a vertical direction in the immediate vicinity of the monitoring electrodes being considered. If the voltage difference between either the $M_1$, $M_1'$ pair of monitoring electrodes or the $M_2$, $M_2'$ pair of monitoring electrodes departs from this desired zero value, then an error signal is fed back by way of adding circuit 103 to the $A_0$ feedback circuits 87 to adjust the magnitude of the survey current being emitted by the $A_0$ electrode. This adjustment serves to reestablish the desired focussed pattern.

At the same time, the magnitudes of the focussing currents emitted by the $A_1$ and $A_2$ electrodes is subject to adjustment. These focussing current adjustments are used to maintain the regions midway between the two pairs of monitoring electrodes at a substantially constant voltage level. In particular, the $A_1$ feedback circuits 86 operate to control the magnitude of the focussing current emitted from the $A_1$ electrode so as to hold the region midway between the $M_1$ and $M_1'$ monitoring electrodes at the desired constant voltage level. At the same time, but independently therefrom, the $A_2$ feedback circuits 88 operate to control the magnitude of the $A_2$ current so as to hold the region midway between the second pair of monitoring electrodes $M_2$ and $M_2'$ at this same desired constant voltage level.

In order to prevent the survey current beam from the $A_0$ electrode from penetrating too deeply into the adjacent earth formation, the return electrodes $B_1$ and $B_2$ for the focussing currents are placed relatively close to the $A_1$ and $A_2$ electrodes. This means that the focussing currents are returned to the borehole more quickly and, hence, do not penetrate as deeply into the adjacent formation. As a consequence, the survey current beam from the $A_0$ electrode will remain focussed for only the lateral distance over which the adjacent focussing current components are flowing in a generally lateral direction. Once the survey current beam gets out past this point, it spreads out fairly rapidly and, hence, rapidly dissipates its effectiveness. The significant part of the survey current flow is the part in the region where the current density is the greatest, namely, in the region where the survey current is being confined to a relatively narrow beam. This is the region where the greatest resistance is offered to the flow of the survey current. Consequently, the magnitude of the survey current is determined primarily by the electrical conductivity of the formation material in this restricted region, which is a region which is immediately adjacent the borehole 16.

The magnitude of the survey current flowing from the $A_0$ electrode is measured by means of the measuring resistor 94 and the amplifier 104. The voltage drop across this resistor 94 is proportional to the magnitude of the survey current and, hence, to the conductivity of the formation material immediately adjacent the borehole 16. This voltage signal is amplified by amplifier 104 and converted to a corresponding direct-current signal by the phase sensitive detector 105. The resulting conductivity signal at the output of phase sensitive detector 105 is supplied to a logarithmic circuit 106 located at the surface of the earth. This shallow zone conductivity signal is designated as $V_s$. Logarithmic circuit 106 operates to develop an output signal $V_s'$ which is directly proportional to the logarithm of the incoming conductivity signal $V_s$. This logarithmic signal $V_s'$ is supplied to the galvanometer 42 to produce the appropriate trace on the recording medium 52.

At the same time that all the foregoing measurements are being made, the magnitude of the spontaneous earth potential at the level of the $A_0$ electrode is also being monitored and recorded by the galvanometer 43. This spontaneous earth potential is of a direct-current nature and a direct-current path is provided between the $A_0$ electrode and the galvanometer 43 by way of the secondary winding of output transformer 90, the inductor 107 and cable conductor $22f$. The other side of the galvanometer 43 is grounded at the surface of the earth in an appropriate manner.

Figure 4:
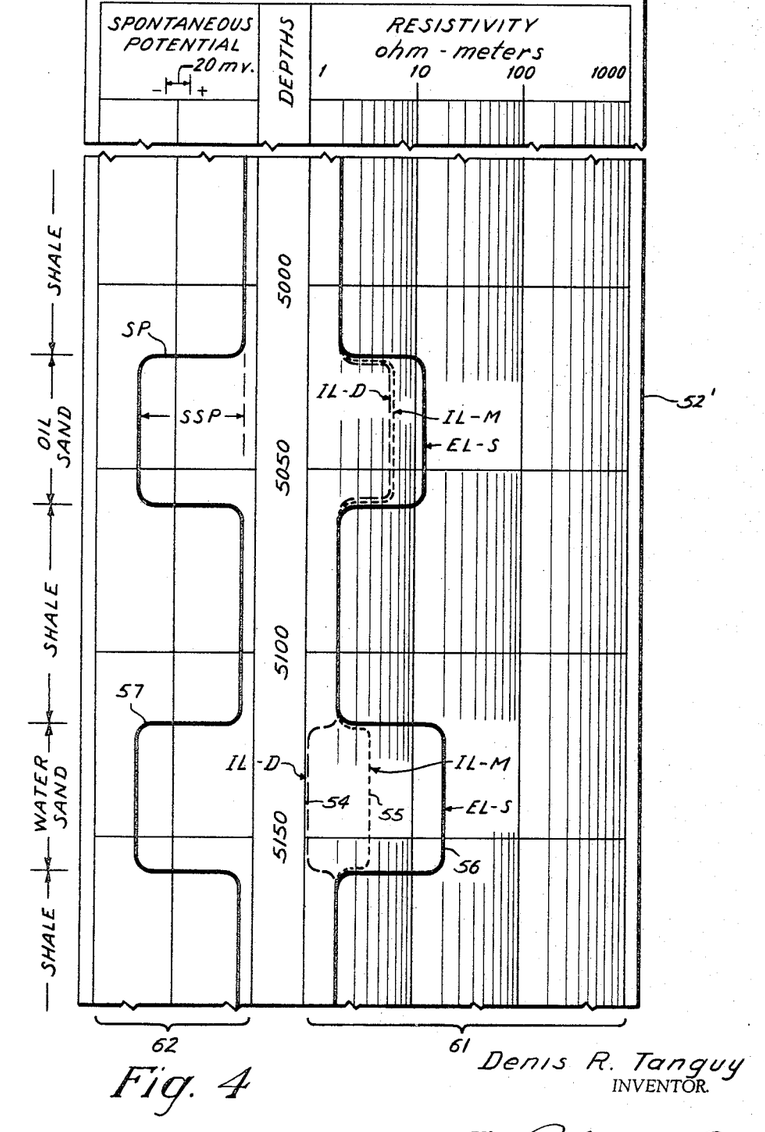
FIG. 4 shows a portion of a typical record or log that is obtained with the apparatus of FIG. 1.

A portion of a typical record or "log" obtained with the present embodiment of apparatus is indicated in FIG. 4 of the drawings. This log 52' is a positive print made from the photosensitive recording medium 52 after it has been chemically processed or developed in the appropriate manner. The various grid lines and headings on the log 52' are placed on the photosensitive recording medium 52 during the course of the borehole measurements by means of suitable optical masks, shutters and intermittent auxiliary light sources in a manner which is known in the art.

As seen in FIG. 4, the traces or recorded curves 54, 55 and 56 for the IL–D, IL–M and EL–S systems, respectively, are recorded on the right-hand portion 61 of the recording medium. The spontaneous potential curve 57, on the other hand, is separately recorded on an adjacent portion 62 of the recording medium. The scale calibration for the IL–D, IL–M and EL–S traces is logarithmic in nature since the signals which produce these traces were converted to logarithmic signals by the logarithmic circuits 76, 80 and 106. It is noted, however, that this logarithmic scale calibration is in terms of "resistivity" and not "conductivity." This is rather unusual since the signals supplied by the downhole exploring systems are "conductivity" signals. It results from a novel relationship between conductivity and resistivity when these factors are considered on a logarithmic basis.

As is known, conductivity is the reciprocal of resistivity. Expressed mathematically:

$$C = \frac{1}{R} \quad (1)$$

where $C$ = conductivity
$R$ = resistivity

Taking the logarithm of both sides of Equation 1 leads to the relationship:

$$\log C = -\log R \quad (2)$$

Thus, a logarithmic resitivity signal is simply a negative version of a logarithmic conductivity signal. In terms of the recording medium, the negative sign relates to the direction of deflection of the galvanometer light beam for increasing signal magnitudes, whether from left to right or from right to left.

In the present apparatus, since the signals supplied to the galvanometers 40, 41 and 42 are conductivity signals, each of these galvanometers is mechanically adjusted so that its zero or "at rest" position causes its light beam to fall on the right-hand extremity of the scale range 61. Then, as the magnitude of the conductivity signal supplied to the galvanometer increases, the light beam is deflected across the recording medium 52 toward the left. Thus, from right to left is the positive direction for a logarithmic conductivity signal. The positive direction for the resistivity scale (the direction of increasing values) is, as indicated on the log 52', from left to right. Thus, the direction of trace deflection for increasing signal values is of opposite polarity or direction to the direction of the increasing scale calibration values and, hence, the relationship of Equation 2 is satisfied. In this manner, the present invention provides a novel means of converting one form of signal indication to a reciprocal form of signal indication.

The fact that the IL–D, IL–M and EL–S signals are recorded on a common recording medium to the same scale factor and the fact that the scale factor is logarithmic in character provides a recorded log which is more readily and easily interpreted and which provides more direct indications of the significant subsurface parameters. The shallow penetration electrode system curve (trace 56 of FIG. 4) provides an indication of the resistivity $R_{xo}$ of the flushed portion of the invaded zone immediately adjacent the borehole wall. The deep penetration coil system curve (trace 54 of FIG. 4) provides an indication of the resistivity $R_t$ of the uncontaminated portion of the formation beyond the invaded zone. The medium penetration coil system curve (trace 55 of FIG. 4) provides an indication of the resistivity of an intermediate zone which will be affected to a greater or lesser degree by mud filtrate invasion, depending on the lateral depth or diameter of such invasion. Consequently, the coincident recording of these three measurements on a common recording medium, as indicated in FIG. 4, indicates at a glance the manner in which the formation resistivity is changing as a function of the lateral or horizontal distance from the borehole.

The separation distance between the two coil system curves (traces 54 and 55) provides an indication of the lateral depth of mud filtrate invasion. If the depth of invasion is relatively shallow, then neither the IL–D nor the IL–M measurement will be appreciably affected by such invasion. In this case, the two traces 54 and 55 will lie on top of one another. This situation is illustrated in FIG. 4 for the oil sand in the vicinity of the 5050 foot depth level. It is also the case for the various shale strata since shale is not permeable and, hence, not subject to any appreciable mud filtrate invasion. (In fact, all three traces should lie on top of one another for the case of thick shale beds.) As the lateral depth of filtrate invasion increases, the separation distance between the IL–D and the IL–M traces increases. This is because the IL–M measurement is being affected more and more by the filtrate invasion. An example of an appreciable depth of invasion is illustrated in the case of the water sand located in the vicinity of the 5150 foot depth level in FIG. 4. For any given ratio of filtrate resistivity to formation water resistivity, this separation distance can be calibrated directly in terms of the diameter $D_i$ of the filtrate invaded zone.

A particularly significant feature of the recorded logs provided with the present apparatus is that the separation distance between the IL–D trace and the EL–S trace (traces 54 and 56 of FIG. 4) is directly related to the formation water saturation factor $S_w$ when both traces are recorded on a common logarithmic scale. This is important because the pore spaces in the subsurface earth formations are almost always completely filled with fluids of one type or another. In the absence of mud filtrate invasion, these fluids are either hydrocarbon fluids or formation water, or some of each. Thus, if the formation pore space is 100% saturated with water ($S_w=100\%$), then there is no oil or other hydrocarbon present. If, on the other hand, the formation pore space is 20% filled with formation water ($S_w=20\%$), then the other 80% of the pore space contains oil or other hydrocarbon fluid. In this manner, knowing the percentage water saturation $S_w$ also tells how much oil or other hydrocarbon is present.

The relationship between the water saturation $S_w$, the formation porosity $\phi$, the resistivity of the formation water $R_w$ and the resistivity $R_t$ of the formation as a whole is described by the following mathematical expression:

$$S_w^2 = \frac{aR_w}{\phi^m R_t} \quad (3)$$

where "$a$" and "$m$" are constants which depend on the particular type of rock structure being investigated. Equation 3 is applicable only to formation zones which have not been contaminated by mud filtrate invasion.

For the case of the flushed zone immediately adjacent the borehole wall, the original formation water has been completely replaced by mud filtrate and, hence, the saturation relationship of Equation 3 can be rewritten as follows for the flushed zone:

$$S_{xo}^2 = \frac{aR_{mf}}{\phi^m R_{xo}} \quad (4)$$

where $S_{xo}$ is the percentage filtrate saturation in the flushed zone, $R_{mf}$ is the resistivity of the mud filtrate and $R_{xo}$ is the resistivity of the flushed zone as a whole.

Combining Equations 3 and 4, it is seen that:

$$S_w = S_{xo} \sqrt{\left(\frac{R_w}{R_{mf}}\right)\left(\frac{R_{xo}}{R_t}\right)} \quad (5)$$

In the case of formations which were originally 100% water bearing, $S_{xo}$ is equal to unity. In formations which contain oil, it sometimes happens that the oil is not completely removed from the flushed zone. In this case, $$S_{xo} = (1 - ROS) \quad (6)$$

where ROS is the residual oil saturation expressed as a fraction of the pore space.

The ratio of $R_w$ to $R_{mf}$ is usually fairly constant over considerable lengths of the borehole. Consequently, changes in the ratio of $R_{xo}$ to $R_t$ provide a direct indication of changes in the water saturation $S_w$. With the present apparatus, the EL–S trace provides an indication of $R_{xo}$ while the IL–D trace provides an indication of $R_t$. Since these two traces are recorded on a common logarithmic scale, the magnitude of the separation distance therebetween is numerically related to the ratio of $R_{xo}$ to $R_t$ and, hence, to the fractional water saturation $S_w$. In particular, as the water saturation increases, the separation distance between the EL–S and IL–D traces increases.

If the ratio of $R_w$ to $R_{mf}$ were always the same, then the separation distances between the EL–S trace and the IL–D trace could be scaled off directly in terms of the fractional water saturation $S_w$. This could be done on a separate movable scale or ruler which could be laid on top of the recorded log to measure this separation distance. Since, the ratio of $R_w$ to $R_{mf}$ may vary somewhat from one section of a borehole to another, a plurality of such scales would be required for the different values of such ratio commonly encountered.

In this regard, the spontaneous potential trace (trace 57 of FIG. 4) is particularly useful. This is because the static spontaneous potential (SSP) is related to the ratio of $R_w$ to $R_{mf}$ in the manner indicated by the following expression:

$$SSP = k \log \frac{R_w}{R_{mf}} \quad (7)$$

By "static" SP is meant the peak value of the SP curve in a permeable bed relative to its value in a nearby shale formation. Thus, the SP trace can be used to indicate the precise scale calibration to be used in measuring the separation distance between the EL–S and IL–D traces. Also, when different permeable beds have approximately the same static SP value, they can be compared directly to determine their relative water saturations.

For the examples given in FIG. 4, the oil sand shows a water saturation value of 32%. Consequently, 68% of the pore space contains oil. For the water sand at the 5150 foot depth, the water saturation is 100%. These differences in water saturation are readily apparent from the differences in the separation differences between the IL–D and EL–S curves in the two beds. For these examples, the formation water resistivity $R_w$ was taken to be 0.05 ohm-meter, the mud filtrate resistivity was taken to be 1.0 ohm-meter, the porosity of the oil sand was taken to be 25% and the porosity of the water sand was taken to be 20%.

In order that the two coil systems and the electrode system may have the desired lateral penetration characteristics and, at the same time, not appreciably interfere with one another, it is necessary that these coil and electrode systems be constructed in a very particular manner.

Considerable care must be exercised in the construction and relative positioning of the various elements of these systems. One set of dimensions which has been found to be particularly suitable for this purpose is given by the following tables:

TABLE I.—COIL SYSTEMS

| Coil | Distance from $A_0$, inches | Relative Number of Turns |
|---|---|---|
| $T_3$ | 115 | −0.15 |
| $R_1$ | 85 | +1.00 |
| $r_4$ | 79 | −0.12 |
| $R_2$ | 75 | −0.25 |
| $T_2$ | 55 | −0.58 |
| $T_1$ | 45 | +2.25 |
| $r_3$ | 25 | −0.15 |
| $R_3$ | 15 | −0.20 |
| $r_1$ | 11 | +1.00 |
| $r_2$ | −15 | −0.50 |

TABLE II.—ELECTRODE SYSTEM

| Electrode: | Distance from $A_0$, inches |
|---|---|
| $B_2$ | 100 |
| $B_1$ | 96 |
| $A_1$ | 20 |
| $M_1'$ | 8 |
| $M_1$ | 6 |
| $A_0$ | 0 |
| $M_2$ | −6 |
| $M_2'$ | −8 |
| $A_2$ | −20 |

In both Tables I and II, the distances are longitudinal distances measured between the center of the $A_0$ electrode and the center of the particular element being considered. Positive distances indicate that the element is located above the $A_0$ electrode, while negative distances indicate that the elements is located below the $A_0$ electrode. In Table I, the number of turns for the various coils are expressed on a relative basis. The actual number of turns may assume any set of values which is obtained by multiplying these relative values by a common multiplier. The polarity signs for the relative turns indicate the relative polarities of the coils, where the main coils $T_1$, $R_1$ and $r_1$ are taken as being of positive polarity.

Another factor which must be taken into consideration is the fact that the measure points for the different exploring systems are located at different longitudinal levels along the support member 20. These measure points or measure levels for the various systems are indicated by the appropriately labeled reference lines in FIG. 1. With respect to the $A_0$ electrode, they are:

TABLE III.—SYSTEM MEASURE POINTS

| System: | Distance from $A_0$, inches |
|---|---|
| IL–D | 65 |
| IL–D' (computed IL–D) | −15 |
| IL–M | 20 |
| EL–S | 0 |
| SP | 0 |

Roughly, the measure points correspond to the longitudinal midpoints of the systems. For the coil systems, the measure points may be shifted somewhat to one side or the other of the physical midpoint depending on how the numbers of coil turns are distributed. For the deep investigating IL–D coil system, the actual measure point of the coil array is located 65 inches above the center of the $A_0$ electrode. For this system, however, the computer 75 located at the surface of the earth serves to provide an 80 inch depth shift. Thus, at any given instant, the computed signal $V_d'$ at the output of computer 75 is for a depth level which is 80 inches below the depth level for the $V_d$ signal being supplied to the input of the computer 75 at that same moment. Consequently, the measure point for the computed IL–D signal, designated as IL–D' in Table III, is located 15 inches below the $A_0$ electrode.

From Table III, it is seen that two of the signals, namely, the EL–S and the SP signal are being obtained at the level of the $A_0$ electrode and, hence, require no depth correction. For the other two signals, the IL–M signal is being obtained 20 inches above the $A_0$ electrode while the computed IL–D signal is being obtained 15 inches below the $A_0$ electrode. These depth discrepancies are corrected in the recorder 38 by the appropriate adjustment of the aperture plates 47 and 48. In particular, the aperture plate 47 is adjusted so that the computed IL–D signal is recorded a distance "$l_1$" below the reference line 64 at which the EL–S and SP signals are being recorded. This distance "$l_1$" on the recorder depth scale corresponds to a distance of 15 inches in the borehole. The aperture plate 48 for the IL–M signal is adjusted so that the signal is recorded a distance "$l_2$" above the reference level 64, which distance corresponds to 20 inches in the borehole.

Figure 5A:
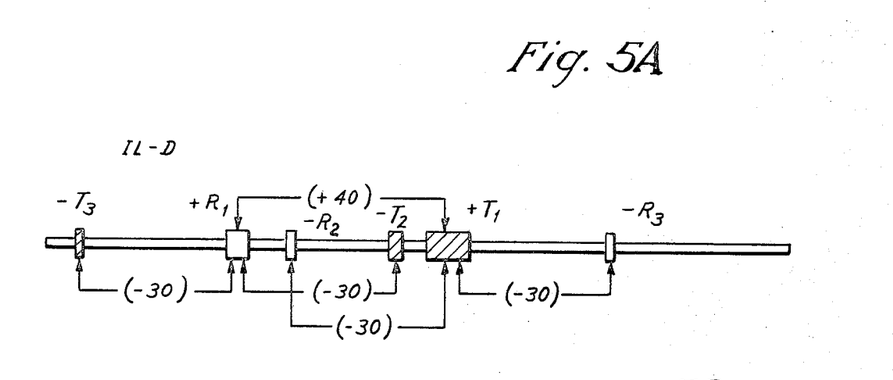
FIGS. 5A and 5B illustrate in a separate manner the different coil systems of the FIG. 1 apparatus and are used in explaining the operation of such coil systems.
Figure 5B:
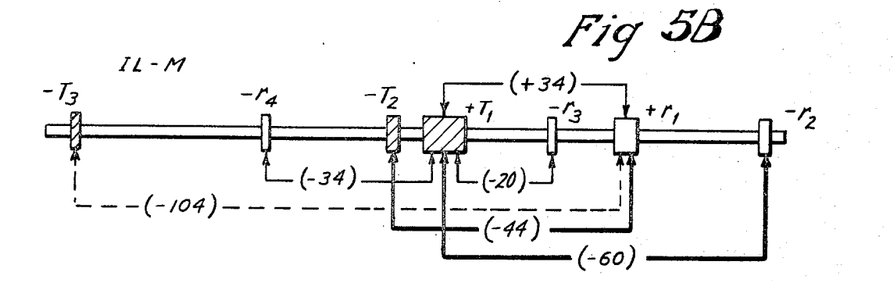

The manner in which the two coil systems IL–D and IL–M are constructed to provide the appropriate lateral investigation depths will be explained with the aid of FIGS. 5A and 5B. These figures give a separate representation of each of the two coil systems, the common transmitter coils appearing in each representation. The depth of investigation for any given coil system is dependent on the separation distances and the relative weights or sensitivities of each of the individual two-coil transmitter-receiver coil pairs which go to make up the system. The number N of individual two-coil pairs in any given multi-coil system is:

$$N = N_T \cdot N_R \qquad (8)$$

where $N_T$ is the number of transmitter coils and $N_R$ is the number of receiver coils. For the IL–D system, for example, there is a total of nine transmitter-receiver pairs since this system includes three transmitter coils and three receiver coils.

The various individual coil pairs, their separation distances (measured between coil midpoints) and their relative sensitivities are given by the following tables:

TABLE IV.—SENSITIVITIES FOR IL–D

| Coil Pair | Spacing (inches) | Relative Sensitivity |
|---|---|---|
| $T_3R_3$ | 100 | +0.03 |
| $T_1R_1$ | 40 | +5.45 |
| $T_2R_3$ | 40 | +0.30 |
| $T_3R_2$ | 40 | +0.12 |
| $T_1R_2$ | 30 | −1.82 |
| $T_1R_3$ | 30 | −1.45 |
| $T_2R_1$ | 30 | −1.88 |
| $T_3R_1$ | 30 | −0.48 |
| $T_2R_2$ | 20 | +0.73 |
| Net | | +1.00 |

TABLE V.—SENSITIVITIES FOR IL–M

| Coil Pair | Spacing (inches) | Relative Sensitivity |
|---|---|---|
| $T_3r_2$ | 130 | +0.03 |
| $T_3r_1$ | 104 | −0.08 |
| $T_3r_3$ | 90 | +0.01 |
| $T_2r_2$ | 70 | +0.22 |
| $T_1r_2$ | 60 | −0.98 |
| $T_2r_1$ | 44 | −0.68 |
| $T_3r_4$ | 36 | +0.03 |
| $T_1r_1$ | 34 | +3.47 |
| $T_1r_4$ | 34 | −0.43 |
| $T_2r_3$ | 30 | +0.15 |
| $T_2r_4$ | 24 | +0.15 |
| $T_1r_3$ | 20 | −0.89 |
| Net | | +1.00 |

The relative sensitivity for each pair is determined in accordance with the relationship:

$$W = \frac{\dfrac{A_t A_r}{L}}{\sum\left(\dfrac{A_t A_r}{L}\right)} \qquad (9)$$

where W denotes the relative weight or sensitivity, $A_t$ is the product of cross-sectional area times number of turns for a transmitter coil, $A_r$ is the product of cross-sectional area times number of turns for a receiver coil and L is the spacing between the transmitter and receiver coil being considered. If all cross-sectional areas are the same, then only the number of turns need be considered. The summation factor forming the denominator of Equation 9 is used to normalize the relative sensitivities so that the algebraic sum of the individual sensitivities is equal to unity. This puts the relative sensitivities on a fractional or percentage basis and makes their comparison somewhat easier. The polarity of the relative sensitivity is determined by the polarities of the two coils comprising the pair. If both are of the same polarity, then the relative polarity for the pair is positive. Otherwise, it is negative.

From Tables IV and V, the significance of the main coil pair in each system, namely, the $T_1R_1$ pair of the IL–D system and the $T_1-r_1$ pair of the IL–M system is readily apparent. These main pairs have relative sensitivities which are noticably greater than the remainder of the coil pairs in the system.

In order to provide a relatively deep lateral depth of investigation for a focussed coil system, it is necessary that the relative sensitivities of the transmitter-receiver coil pairs which have a spacing or separation distance equal to or greater than the spacing of the main coil pair be predominantly of the same polarity as the polarity of the main pair sensitivity. Since the assumptions regarding the main pair polarities make the main pair sensitivity postive, the relative sensitivities of the other large spacing coil pairs must also be predominantly positive. From Table IV, it is seen that this condition is met by the IL–D coil system since the net relative sensitivity of all the coil pairs having a separation distance equal to or greater than the separation distance of the main pair $T_1-R_1$ is positive. In fact, not only is the net or algebraic sum of these sensivities positive, but the individual sensitivities of each of these coil pairs is also positive.

Another way of lookng at it is to say that the negative sensitivity pairs are made to have short spacings compared to the main pair spacing. The manner in which this is done is graphically illustrated in FIG. 5A. All of the negative sensitivity spacings are indicated in FIG. 5A and, as seen by comparison with the positive main pair spacing (+40), these negative spacings are all less than this main pair spacing.

In order to provide a reduced lateral depth of investigation, as is required for the medium depth IL–M system, it is necessary that the net relative sensitivity of all the resulting transmitter-receiver coil pairs having a separation distance equal to or greater than the separation distance of the main coil pair $T_1-r_1$ be of opposite (negative) polarity to the sensitivity of the main pair. That the IL–M system meets this condition may be verified from the data of Table V. The significance of this requirement may be seen from the representation of the IL–M system in FIG. 5B, wherein all of the negative sensitivity spacings are shown. From FIG. 5B, it is seen that the IL–M system has significant negative sensitivities associated with coil spacings which are greater than the spacing (+34) of the main pair.

From the foregoing, it is seen that large positive spacings tend to increase the lateral depth of investigation, while large negative spacings tend to decrease the lateral depth of investigation.

Another useful way of comparing focussed coil systems is to consider their effective lengths. The effective length L′ of a focussed coil system may be defined as:

$$L' = \frac{\sum (A_t A_r)}{\sum \left(\frac{A_t A_r}{L}\right)} \quad (10)$$

An evaluation of the effective lengths for the IL–D and IL–M coil systems shows that the IL–D system has an effective length of 81 inches while the IL–M system has an effective length of 18 inches. As a rule, the greater the effective length, the greater the lateral depth of investigation.

The construction of the various electrodes comprising the EL–S electrode system and their location relative to the coil system coils also requires considerable care. Various factors which should be taken into consideration are discussed in the above-mentioned copending application Serial No. 743,604 of Schneider. The particular embodiments described in this copending application relate to the combination of a single coil system with a single electrode system. The various considerations therein set forth are, however, also applicable to the present apparatus and, if followed, will enable the proper construction and location of the electrodes of the present apparatus.

From the foregoing descriptions of the various features of the present invention, it is seen that borehole investigating apparatus constructed in accordance with the present invention provides a greater number of accurately focussed measurements of selected formation regions than has been heretofore possible to obtain with a single piece of apparatus. In addition, the manner in which the particular formation regions have been selected and the manner in which the measurements are displayed on the recorded log considerably simplify the interpretation of the log and enable more reliable determinations of the character of the subsurface formation fluids in a more efficient and less time-consuming manner.

While there has been described what is at present considered to be a preferred embodiment of this invention, it will be obvious to those skilled in the art that various changes and modifications may be made therein without departing from the invention and it is, therefore, intended to cover all such changes and modifications as fall within the true spirit of the invention.

What is claimed is:

1. A method of obtaining an improved indication of the nature of subsurface earth formations traversed by a borehole comprising: measuring the electrical resistance of the formation material at a first lateral distance from the borehole by means of a shallow-penetration electrode system; simultaneously measuring the electrical resistance of the formation material at a second lateral distance from the borehole by means of a first focussed coil system which is predominantly responsive to formation material at this second lateral distance; simultaneously measuring the electrical resistance of the formation material at a third lateral distance from the borehole by means of a second focussed coil system which is predominantly responsive to formation material at this third lateral distance; repeating these measurements in a continuous manner along a desired length of the borehole; and recording the electrode system measurements, the first focussed coil system measurements and the second focussed coil system measurements as individual traces on a common recording medium as a function of borehole depth.

2. A method of obtaining an improved indication of the nature of subsurface earth formations traversed by a borehole comprising: measuring the electrical resistance of the formation material at a first lateral distance from the borehole by means of a focussed shallow-penetration electrode system; simultaneously measuring the electrical resistance of the formation material at a second lateral distance from the borehole by means of a first focussed coil system which is predominantly responsive to formation material at this second lateral distance; simultaneously measuring the electrical resistance of the formation material at a third lateral distance from the borehole by means of a second focussed coil system which is predominantly responsive to formation material at this third lateral distance; repeating these measurements in a continuous manner along a desired length of the borehole;

and recording the electrode system measurements, the first focussed coil system measurements and the second focussed coil system measurements as individual traces on a common recording medium as a function of borehole depth.

3. A method of obtaining an improved indication of the nature of subsurface earth formations traversed by a borehole containing a drilling fluid comprising: measuring the electrical resistance of the formation material at a first lateral distance from the borehole by means of a shallow-penetration electrode system; simultaneously measuring the electrical resistance of the formation material at a second lateral distance from the borehole by means of a first focussed coil system which is predominantly responsive to formation material at this second lateral distance; simultaneously measuring the electrical resistance of the formation material at a third lateral distance from the borehole by means of a second focussed coil system which is predominantly responsive to formation material at this third lateral distance; simultaneously measuring the naturally-occurring spontaneous earth potential existing in the fluid-filled borehole; repeating these measurements in a continuous manner along a desired length of the borehole; recording the electrode system measurements, the first focussed coil system measurements and the second focussed coil system measurements as individual traces as a function of borehole depth on a common portion of a common recording medium with the same scale sensitivity factor so that the traces will coincide whenever the resistance values are equal; and recording the spontaneous earth potential measurements as a function of borehole depth on an adjacent portion of the common recording medium.

4. In apparatus for investigating earth formations traversed by a borehole, the combination comprising: an elongated support member adapted for movement through the borehole; a plurality of transmitter coils secured to the support member and including a primary transmitter coil having a greater number of turns than any other transmitter coil; a first plurality of receiver coils secured to the support member and including a primary receiver coil having a greater number of turns than any other of these receiver coils, the locations and polarities of these first receiver coils being such that the net relative sensitivity of all the transmitter-receiver coil pairs having a separation distance greater than the separation distance of the coil pair formed by the primary transmitter and receiver coils is of the same polarity as the relative sensitivity of this primary coil pair; a second plurality of receiver coils secured to the support member and including a primary receiver coil having a greater number of turns than any other of these second receiver coils, the locations and polarities of these second receiver coils being such that the net relative sensitivity of all the transmitter and second receiver coil pairs having a separation distance greater than the separation distance of the coil pair formed by the primary transmitter coil and the second primary receiver coil is of opposite polarity to the relative sensitivity of this second primary coil pair; circuit means for supplying energizing current to the transmitter coils; and means for providing separate indications of the net signals induced in the two sets of receiver coils by currents flowing in the adjacent earth formations.

5. In apparatus for investigating earth formations traversed by a borehole, the combination comprising: an elongated support member adapted for movement through the borehole; a plurality of transmitter coils secured to the support member and including a primary transmitter coil having a greater number of turns than any other transmitter coil; supply circuit means for supplying energizing current to the transmitter coils, this supply circuit means interconnecting the transmitter coils with at least one transmitter coil being connected in a series-opposing manner with respect to another transmitter coil; a first plurality of receiver coils secured to the support member and including a primary receiver coil having a greater number of turns than any other of these receiver coils; first output circuit means interconnecting the first receiver coils with at least one receiver coil being connected in a series-opposing manner with respect to another receiver coil; the first receiver coils being positioned along the support member relative to the transmitter coils so that the net relative sensitivity of all the transmitter-receiver coil pairs having a separation distance greater than the separation distance of the coil pair formed by the primary transmitter and receiver coils is of the same polarity as the relative sensitivity of this primary coil pair; a second plurality of receiver coils secured to the support member and including a primary receiver coil having a greater number of turns than any other of these second receiver coils; second output circuit means interconnecting the second receiver coils with at least one receiver coil being connected in a series-opposing manner with respect to another receiver coil; the second receiver coils being poistioned along the support member relative to the transmitter coils so that the net relative sensitivity of all the resulting transmitter and second receiver coil pairs having a separation distance greater than the separation distance of the coil pair formed by the primary transmitter coil and the second primary receiver coil is of opposite polarity to the relative sensitivity of this second primary coil pair; and means coupled to the first and second output circuit means for providing separate indications of the net signals induced in the two sets of receiver coils by current flowing in the adjacent earth formations.

6. In apparatus for investigating earth formations traversed by a borehole, the combination comprising: an elongated support member adapted for movement through the borehole; a plurality of transmitter coils secured to the support member and including a primary transmitter coil having a greater number of turns than any other transmitter coil; supply circuit means for supplying energizing current to the transmitter coils, this supply circuit means interconnecting the transmitter coils with at least one transmitter coil being connected in a series-opposing manner with respect to another transmitter coil; a first plurality of receiver coils secured to the support member and including a primary receiver coil having a greater number of turns than any other of these receiver coils; first output circuit means interconnecting the first receiver coils with at least one receiver coil being connected in a series-opposing manner with respect to another receiver coil; the first receiver coils being longitudinally positioned along the support member relative to the transmitter coils so that the net relative sensitivity of all the transmitter-receiver coil pairs having a separation distance greater than the separation distance of the coil pair formed by the primary transmitter and receiver coils is of the same polarity as the relative sensitivity of this primary coil pair; a second plurality of receiver coils secured to the support member and including a primary receiver coil having a greater number of turns than any other of these second receiver coils; second output circuit means interconnecting the second receiver coils with at least one receiver coil being connected in a series-opposing manner with respect to another receiver coil; the second receiver coils being longitudinally positioned relative to the transmitter coils so that the net relative sensitivity of all the resulting transmitter and second receiver coil pairs having a separation distance greater than the separation distance of the coil pair formed by the primary transmitter coil and the second primary receiver coil is of opposite polarity to the relative sensitivity of this second primary coil pair; first and second phase selective circuit means individually coupled to the first and second output circuit means for providing first and second electrical signals individually representative of the net signal components of a predetermined phase which are induced in the two sets of receiver coils; and recording means for recording these first and second electrical signals on a common recording medium as a function of borehole depth.

References Cited

UNITED STATES PATENTS

| | | | |
|---|---|---|---|
| 2,582,314 | 1/1952 | Doll | 324—6 |
| 3,052,835 | 9/1962 | Dunlap et al. | 324—1 |
| 3,075,142 | 1/1963 | Albright et al. | 324—1 |
| 3,076,928 | 2/1963 | Waters | 324—6 X |
| 3,079,550 | 2/1963 | Huddleston et al. | 324—6 X |
| 3,086,168 | 4/1963 | Buckner | 324—6 |
| 3,124,742 | 3/1964 | Schneider | 324—6 X |
| 3,181,057 | 4/1965 | Bravenec | 324—6 X |
| 3,259,836 | 7/1966 | Oshry | 324—6 |

OTHER REFERENCES

Doll et al., "Suggestions For Better Electric Log Combinations and Improved Interpretations," Geophysics, vol. XXV, No. 4 (August 1960), pp. 854–882.

WALTER L. CARLSON, *Primary Examiner.*

G. R. STRECKER, *Assistant Examiner.*

UNITED STATES PATENT OFFICE
CERTIFICATE OF CORRECTION

Patent No. 3,329,889                                July 4, 1967

Denis R. Tanguy

It is hereby certified that error appears in the above numbered patent requiring correction and that the said Letters Patent should read as corrected below.

Column 1, line 61, after "invasion" insert -- varies --; column 6, line 75, before "portion" insert -- second --; column 7, line 34, for "22" read -- 22a --; column 16, lines 10 to 12, equation (5) should appear as shown below instead of as in the patent:

$$S_w = S_{xo} \sqrt{\left(\frac{R_w}{R_{mf}}\right)\left(\frac{R_{xo}}{R_t}\right)}$$

column 17, line 36, for "elements" read -- element --.

Signed and sealed this 29th day of October 1968.

(SEAL)
Attest:

EDWARD M. FLETCHER, JR.                   EDWARD J. BRENNER
Attesting Officer                           Commissioner of Patents